Patented Nov. 4, 1924.

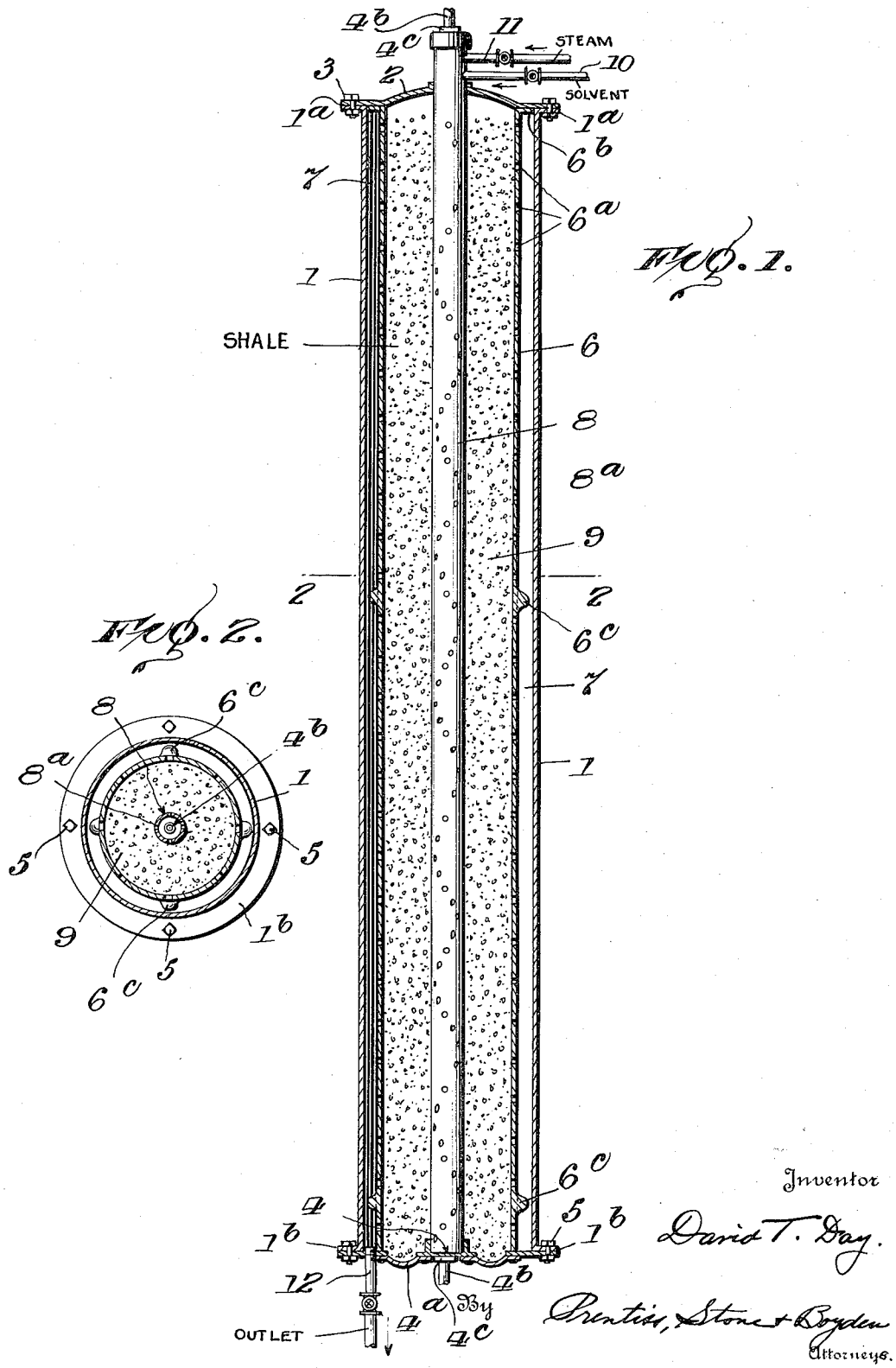

1,513,746

UNITED STATES PATENT OFFICE.

DAVID T. DAY, OF WASHINGTON, DISTRICT OF COLUMBIA.

FUEL AND PROCESS OF PREPARING THE SAME.

Original application filed January 15, 1921, Serial No. 437,418. Divided and this application filed March 2, 1922. Serial No. 540,548.

*To all whom it may concern:*

Be it known that I, DAVID T. DAY, a citizen of the United States, residing at Washington, District of Columbia, have invented certain new and useful Improvements in Fuel and Processes of Preparing the Same, of which the following is a specification.

This invention relates in general to waxes and to processes of extracting mineral waxes from earthly materials containing the same. The invention also relates particularly to the formation of an artificial fuel formed incident to the process of extracting natural waxes and resins from shale containing the same in nature.

This application is a division of applicant's copending application Serial No. 437,418, filed Jan. 15, 1921.

The object of the invention is to provide a new fuel compound formed as an incident to the extraction of mineral waxes and resins from native shale.

The invention has disclosed the fact that certain oil shales, and particularly those found near Elko, Nevada, have substantial amounts of mineral wax and resin, which may be obtained by following the process outlined hereinafter. This material contains paraffin wax and resin amounting to from 15 to 25 per cent of the total weight of the untreated shale. When such shale is in a fairly dry condition and is reduced into small fragments, such as may pass through a ten mesh sieve, and then boiled in alcohol, it is found that the alcohol has dissolved out a paraffin-like substance which may be collected and used. This is done by removing the alcoholic solution with the dissolved material from the shale, decanting or filtering this solution, permitting the solution to cool and thus precipitating the paraffin-like substance, and subsequently separating the resultant solvent from the precipitate. The cold alcohol is suitable for use on another batch of material in the same manner as used for the first batch, and the same alcohol may be re-used many times. When the precipitate is distilled to drive off any remaining alcohol, a light waxy substance containing substantial amounts of ozokerite is left behind. This waxy substance has the unusually high melting point of at least 150° F., and varies to 165° F. If the alcohol is not distilled off, as just mentioned, the cold precipitate will be found to contain alcohol combined with resin and paraffin in the form of an alcohol solid emulsion suitable for use as a fuel, being both conveniently and cleanly handled and possessing great fuel value.

The process has been successfully conducted in a relatively simple form of apparatus which is illustrated in the accompanying drawing, in which:

Figure 1 represents an elevation in section illustrating the relative position of the parts, and Figure 2 is a cross section taken on the line 2—2 of Figure 2 looking downward.

Referring to the drawing in detail, the apparatus is formed by an upright cylinder 1 which may have the dimensions ten feet long and fourteen inches in diameter. The top of the cylinder 1 is provided with an outwardly extending flange 1$^a$ adapted to receive a cover plate 2 secured by fastening bolts 3. The lower end of the cylinder 1 has a corresponding flange 1$^b$ adapted to have a lower cover plate 4 placed thereon and secured by fastening bolts 5. In the cover plate 4 are suitable openings covered by small cover plates 4$^a$. In the interior of the apparatus is a second cylindrical member 6 extending the full length of the apparatus and spaced from the cylinder 1 so as to provide the annular space 7. This cylinder 6 may be twelve inches in diameter and ten feet long and is necessarily perforated with a plurality of openings 6$^a$, the purpose of which will be described hereinafter. At the top of the member 6 is an outwardly extending flange 6$^b$ which serves to space the upper end centrally within the cylinder 1. At suitable points along the length of the apparatus are suitable spacing lugs 6$^c$ illustrated as secured to the cylinder 6. These lugs serve to maintain the annular space 7 uniform around the cylinder 6. In the center of the apparatus is a small tube of approximately three inch bore indicated by the numeral 8 and preferably extending the length of the cylinders 1 and 6 and slightly beyond one end thereof. This inner tube 8 is also provided with a plurality of perforations 8$^a$ and is centrally positioned with respect to the cylinders 1 and 6 by suitable fastenings at the bottom and at the top by extending through the center of the cover plate 2. The annular space between the central tube 8 and the cylinder 6 is indicated by 9 and is adapted to be filled with shale. At the top of the structure is a pipe 10 leading into the tube 8 for introduction of solvent, and a second pipe 11 for the introduction of steam. A second steam pipe 4^b which is imperforate extends through the top 2, downwardly through the tube 8, and out through the lower plate 4. Lock means 4^c are provided on the pipe 4^b to make fluid tight connections with the cover plates 2 and 4. At the base of the structure is a drain pipe 12 inserted through the lower cover plate 4 and communicating with the annular space 7.

The apparatus may be used to conduct the process of extraction according to the following steps of operation. The annular space 9 is poured full of shale crushed to about one-half inch and smaller. The cover plate is closed and the valve in the drain pipe 12 is closed. Solvent is introduced through the pipe 10 and fills the tube 8, passing through the openings 8^a and saturating the shale in the space 9. Steam is then introduced through the pipe 4^b, serving to boil the solvent and thus facilitate the operation of dissolving the soluble material from the shale. If the solvent is gasoline and hence not subject to dilution by condensed steam, as in the case of alcohol, steam may also be admitted through the pipe 11 and into the tube 8, passing through the perforations 8^a into the shale, thus boiling the solvent therein, and serving also to drive the solvent and extracted material from the shale. The extracted matter and solvent passes through the perforations 6^a into the annular space 7 and may be withdrawn through the pipe 12. After a batch of shale has been treated the lower plate covers 4^a may be opened and the shale removed from the space 9 and the process repeated.

The process provides for the heating of the solvent up to its boiling point to facilitate the extraction of soluble material from the shale. After extraction the material drawn from the pipe 12 is cooled to precipitate a material which is chiefly resin and paraffin and which will contain a small proportion of solvent, which latter may be distilled off and recovered. The major portion of the solvent is freed during the cooling and precipitation.

Ninety-five per cent alcohol has been used with success and re-used as many as twelve times on successive batches of shale. When alcohol is used the extracted matter is a resin mixed with paraffin wax, if Nevada shale is used.

Other solvents than alcohol may be used. If gasoline or kerosene is used the shale gives up all soluble matter and the general product is oil. When kerosene or gasoline is used as the solvent the paraffin wax will separate out under proper conditions of freezing. That is, paraffin wax and resin are both very insoluble in gasoline or kerosene, cooled below the freezing point of water. When gasoline is used as a solvent it is usually used under pressure to prevent bringing it to the boiling point and yet have it about as hot as the boiling point of water.

The separation of the resin and the wax may be accomplished by dissolving a mixture of the two substances in hot gasoline and permitting the gasoline and dissolved material to cool slowly, the result being that the resin will crystallize out of the mixture, leaving the wax in solution in the gasoline. Such treatment indicates that the resin has a melting point varying from 165° F. to 170° F.

It is preferable that the materials taken from the pipe 12 be filtered while hot. The process includes the feature of heating by steam, or other vapor, which is economical and serves to raise the temperature of the solvent to the boiling point, and the subsequent cooling of the material taken from the pipe 12 serves to drop a large proportion of the material extracted. The apparatus may be provided with necessary gaskets in order to maintain a tight structure so that the pressure may be raised in order that the boiling point of the solvent may be raised. Increased pressure is not obsolutely necessary but has effected economy.

I claim:

1. The fuel product resulting from the treatment with hot alcohol of a mineral containing paraffin wax and resin.

2. The fuel product resulting from the treatment of a natural earthy material containing paraffin wax and resin with a solvent in which the earthy material is not soluble but which solvent is capable of extracting the paraffin wax and resin.

3. The solid emulsion fuel product resulting from the treatment of a natural earthy material containing paraffin wax and resin with a solvent in which the earthy material is not soluble but which solvent is capable of extracting the paraffin wax and resin, the product being free from liquid solvent.

4. The solid emulsion fuel product resulting from the treatment with hot alcohol of a natural earthy material containing paraffin wax and resin.

5. The fuel product resulting from the treatment of a natural earthy material containing paraffin wax and resin with alcohol and from which free alcohol has been removed.

6. The process of preparing a fuel which comprises treating a natural earthy material containing paraffin and resin with alcohol and dissolving out the paraffin and resin, thereby removing the major portion of the alcohol from the solution so produced, thus leaving the resultant material as an emulsion of alcohol, paraffin and resin.

7. The process of preparing a fuel which comprises treating a natural earthy material containing paraffin and resin with alcohol and dissolving out the paraffin and resin thereby, removing the major portion of the alcohol from the solution of alcohol, paraffin and resin.

8. The process of preparing a fuel which comprises treating a material containing paraffin and resin with alcohol to dissolve out the paraffin and resin, raising the temperature of the alcohol solvent at least to its boiling point, removing the major portion of the alcohol from the solution so produced, thus leaving the resultant material as an emulsion of alcohol, paraffin and resin.

In testimony whereof I affix my signature.

DAVID T. DAY.